(12) United States Patent
Freire et al.

(10) Patent No.: US 7,817,919 B1
(45) Date of Patent: Oct. 19, 2010

(54) METHOD FOR TRANSMISSION OF DATA PACKETS BY MEANS OF AN OPTICAL BURST SWITCHING NETWORK AND NETWORK NODES FOR AN OPTICAL BURST SWITCHING NETWORK

(75) Inventors: Mário Freire, Covilha (PT); Nuno Garcia, Covilha (PT); Paulo Monteiro, Ilhavo (PT); José Miguel Ramalho Ribeiro dos Santos, Lisboa (PT)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 579 days.

(21) Appl. No.: 11/794,285

(22) PCT Filed: Dec. 22, 2005

(86) PCT No.: PCT/EP2005/013917

§ 371 (c)(1),
(2), (4) Date: Jun. 26, 2007

(87) PCT Pub. No.: WO2006/072406

PCT Pub. Date: Jul. 13, 2006

(30) Foreign Application Priority Data

Dec. 30, 2004 (EP) .................................. 04031049

(51) Int. Cl.
*H04J 14/00* (2006.01)
*H04B 10/24* (2006.01)
*H04B 10/20* (2006.01)

(52) U.S. Cl. ............................. 398/51; 398/48; 398/45; 398/43; 398/52; 398/54

(58) Field of Classification Search .................... 398/51, 398/66, 48, 45, 43
See application file for complete search history.

(56) References Cited

U.S. PATENT DOCUMENTS 6,609,840 B2 * 8/2003 Chow et al. .................. 398/102

(Continued)

FOREIGN PATENT DOCUMENTS

WO   WO 2004/107798 A1   12/2004
WO   WO 2004107798 A1 *  12/2004

OTHER PUBLICATIONS

Xiong Y et al, "Control Architecture in Optical Burst-Switched WDM Networks", IEEE Journal on Selected areas in Communications, IEEE Service Center, Piscataway, NJ, US, vol. 18, N. 10, Oct. 2000, pp. 1838-1851, XP000976892, ISSN: 0733-8716.

(Continued)

*Primary Examiner*—Ken N Vanderpuye
*Assistant Examiner*—Oommen Jacob
(74) *Attorney, Agent, or Firm*—Laurence A Greenberg; Werner H Stemer; Ralph E Locher (57) ABSTRACT

There is described a transmission in a burst switching network, whereby data packets are collected to form a burst which is provided with a header. A loop-free common control channel is provided in the optical burst switching network to which all network nodes have access. Headers are transmitted by the loop-free control channel such that a header is distributed virtually in parallel to all network nodes and processed virtually in parallel in the network nodes.

8 Claims, 6 Drawing Sheets

U.S. PATENT DOCUMENTS

| | | | |
|---|---|---|---|
| 2002/0118419 A1* | 8/2002 | Zheng et al. | 359/139 |
| 2003/0067919 A1* | 4/2003 | Qiao et al. | 370/392 |
| 2003/0185153 A1 | 10/2003 | Köhler et al. | |
| 2003/0189933 A1* | 10/2003 | Ozugur et al. | 370/395.1 |
| 2005/0083949 A1* | 4/2005 | Dobbins et al. | 370/395.53 |
| 2005/0135807 A1* | 6/2005 | Fujita et al. | 398/45 |
| 2009/0067837 A1* | 3/2009 | Hesse et al. | 398/51 |

OTHER PUBLICATIONS

Baldine I et al, "Jumpstart: A Just-In-Time Signaling Architecture for WDM Burst-Switched Networks", IEEE Communications Magazine, IEEE Service Center, New York, NY, US, vol. 40, No. 2, Feb. 2002, pp. 82-89, XP001125422, ISSN: 0163-6804.

* cited by examiner

METHOD FOR TRANSMISSION OF DATA PACKETS BY MEANS OF AN OPTICAL BURST SWITCHING NETWORK AND NETWORK NODES FOR AN OPTICAL BURST SWITCHING NETWORK

CROSS REFERENCE TO RELATED APPLICATIONS

This application is the US National Stage of International Application No. PCT/EP2005/013917, filed Dec. 22, 2005 and claims the benefit thereof. The International Application claims the benefits of European application No. 04031049.2 EP filed Dec. 30, 2004, both of the applications are incorporated by reference herein in their entirety.

Method for transmission of data packets by means of an optical burst switching network and network nodes for an optical burst switching network.

FIELD OF INVENTION

The invention relates to a method in accordance with the preamble of claim 1 and a network node for an optical burst switching network.

SUMMARY OF INVENTION

In future data packets are to be transmitted via optical burst switching networks, abbreviated to OBS networks. These OBS networks feature a number of network nodes or network elements which are interconnected by optical fibers. In this case a number of data packets, such as IP packets, are aggregated or collected in an ingress network node of the OBS network into a so-called burst, then transmitted with the burst over the optical burst switching network to a destination network node of the optical burst switching network. There the burst is split back up into its data packets which are then transmitted onwards. Each burst is assigned a header, which is sent before the transmission of the burst to configure the network node of the network for the transmission of the burst in the optical burst switching network. In such cases the header is received in each network node on the planned route of the burst to its destination node, opto-electrically converted, evaluated, electro-optically converted and sent to the next network node on the path to the destination network node. After the evaluation of the header in the network node a reservation of the transmission capacity of the network node for the transmission of the burst announced by the header is undertaken. Configuration includes setting up or prior reservation of transmission paths in the network node for the smooth transmission or forwarding of the burst, so that at the time at which the burst is transmitted the transmission paths are switched in the network node.

After the header has been sent out the burst is sent out and transmitted depending on what is referred to as the reservation method.

There are different reservation methods for reservation by a header for the burst in the network node. A distinction is made in this case between what are known as one-way and two-way reservation protocols.

With one-way reservation protocols the headers are sent in the ingress nodes into the OBS network, an interval is allowed to elapse and the burst is sent afterwards. This is done in the expectation that the network nodes on the route to the destination node will be configured by the header in the interval and the burst will subsequently be transmitted without errors through the OBS network.

With two-way reservation protocols a first header is sent into the OBS network in the ingress node which configures the network nodes, and after successful configuration, generally of all network nodes on the route to the destination network node, a second message or a second header is sent back to the ingress network node with the information that the reservation by the first header was successful. Only then will the burst of the first header be sent into the OBS network and be successfully transmitted over the pre-configured network to the destination network node.

Each of the two types of reservation method has advantages and disadvantages. The first type of reservation method, the one-way reservation protocols are faster for the transmission of bursts, since there is no wait for the confirmation of the reservation. However, with simultaneous reservation requests by two or more headers the danger of blockages and burst losses arises. Two-way reservation protocols are safer in the transmission, since a burst is only sent out if there is a configured path in the network node. However the transmission is slower to the extent that a longer time elapses until a burst is sent out. In addition the method is more complex. The one-way reservation is also referred to as Tell-and-Go reservation, abbreviated to TAG-OBS. Two-way reservation is also referred to Tell and Wait, abbreviated to TAW-OBS.

An object of the present invention is to improve the transmission of data packets in an optical burst switching network.

This object is achieved by a method with the features of an independent claim and a network node with the features of a further independent claim.

The advantage of the method lies in the fact that, by using a common control channel for headers, a faster distribution of the headers in the entire network and a virtually parallel processing of the headers in the network node are achieved, so that a faster reservation of the transmission paths in the network node for the bursts is achieved. In this method the loop-free shared control channel means that the headers are transmitted or distributed virtually in parallel to the network node, without any opto-electrical conversion and electro-optical conversion respectively having to be undertaken in the network node.

Advantageous embodiments of the invention are specified in the subclaims.

In an embodiment of the invention the spanning tree procedure or spanning tree protocol is used to set up a loop-free control channel. This has the advantage of a standardized and simple method being used for setting up the loop-free common control channel.

In an embodiment of the invention an optical wavelength division multiplex channel is used exclusively as the common control channel for the transmission of the headers. This has the particular advantage of a simple implementation being provided for the common control channel.

BRIEF DESCRIPTION OF THE DRAWINGS

An exemplary embodiment of the invention is explained in more detail below with reference to the drawing.

The Figure shows

DETAILED DESCRIPTION OF INVENTION

Figure 1:
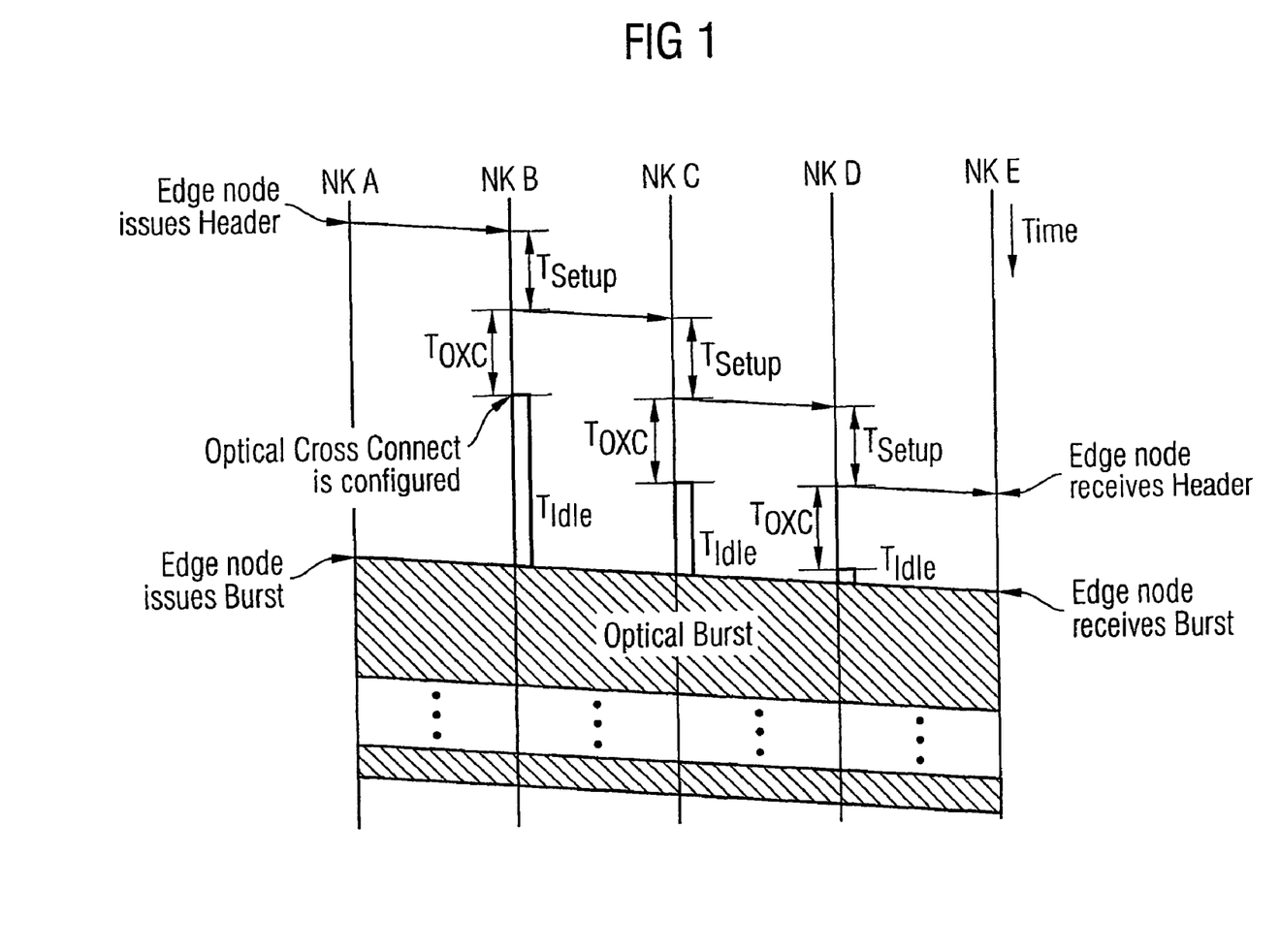
FIG. 1 a diagram for the execution sequence of the reservation in an OBS network in accordance with the prior art.

FIG. 1 shows a diagram for the timing of the execution of the reservation in an OBS network in accordance with the prior art. Vertical lines symbolize in each case a network node NK A, NK B, NK C, NK D, NK E, wherein a burst, consisting of a number of data packets, such as IP packets, is to be transmitted from ingress or edge network node NK A of the OBS network, via the network nodes NK B, NK C, NK D, to output, destination or edge network node NK E of the OBS network. The chronological execution sequence is to be read in FIG. 1 from top to bottom, as indicated by the arrow labeled Time. In the ingress node NK A data packets are aggregated into a burst. Once the aggregation of a burst is completed so that this can be sent to the destination network node, a header or a so-called control packet is created, with the aid of which the reservation of the path for the burst in the network node of the OBS network is to be executed. For this purpose the header contains information such as the burst length and the time at which the burst was sent out.

The header is transmitted from network node NK A to network node NK B, which is indicated by a horizontal arrow between the vertical lines for the network node NK A and NK B. In accordance with the prior art the header is opto-electrically converted in network node B, evaluated, after which a reservation of the transmission path for the burst in the network node NK B is undertaken, electro-optically converted and transmitted to the next network node NK C on the route to the destination network node (NK E).

The time for the processing of the header in a network node, i.e. the opto-electrical conversion, evaluation, electro-optical conversion and sending out of the header is identified by $T_{setup}$. The time for the configuration of the network node for the transmission or forwarding of a burst through the network node is identified by $T_{OXC}$.

In network node NK C the header is again opto-electrically converted, after which a reservation is performed, electro-optically converted and transmitted to the next network node NK D on the route to destination network node (NK E).

In network node NK D this processing of the header is again undertaken and it is transmitted to the destination network node NK E.

Frequently no further configuration is necessary for receiving a burst in the destination network node NK E so that at most the header is evaluated.

The result of this for a transmission link, with the header having to be processed in n network nodes, is a transmission time to the destination network node for the header of:

$$T_H = n \times T_{setup}$$

As a rule the time for the configuration of a network node $T_{OXC}$ is somewhat greater than the processing time of a header $T_{setup}$. With current implementations the processing time $T_{setup}$ is in the two-digit microsecond range and the configuration time $T_{OXC}$ in the single-digit millisecond range.

Consequently in accordance with FIG. 1 the configuration time at least in the penultimate network node (NK D) is to be included for the earliest point in time of the QTL message of a burst at the transmission time TB of the header to make a transmission from network node NK A to network node NK E possible.

This produces the following equation for the time until the sending out/transmission of the burst:

$$T_B \geq TH + TOXC = n \times T_{setup} + T_{OXC}$$

The timing of the transmission of the burst through the OBS network is indicated in FIG. 1 by the horizontal block Optical Burst.

Figure 2:
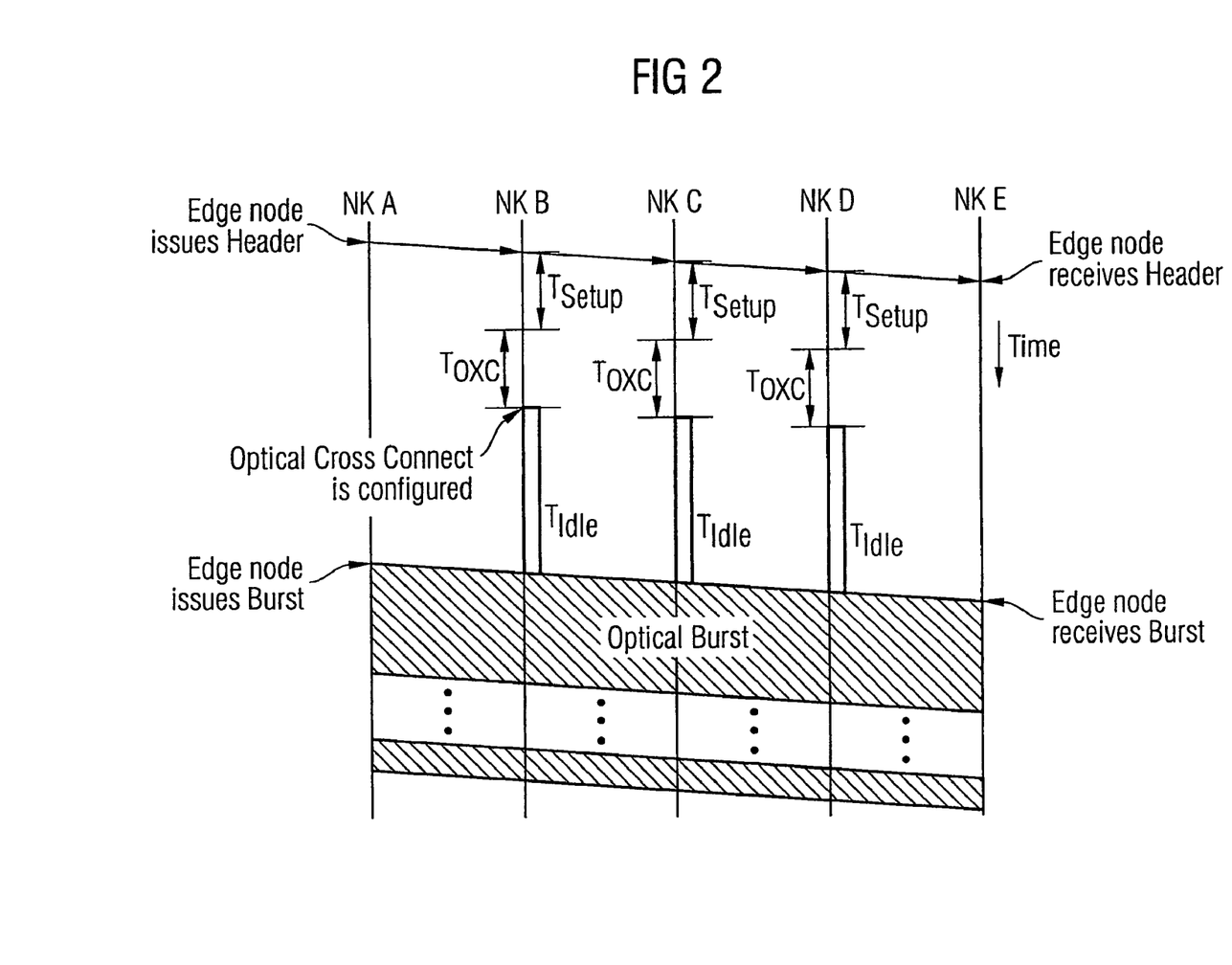
FIG. 2 a diagram for the inventive execution sequence of the reservation in an OBS network.
Figure 3:
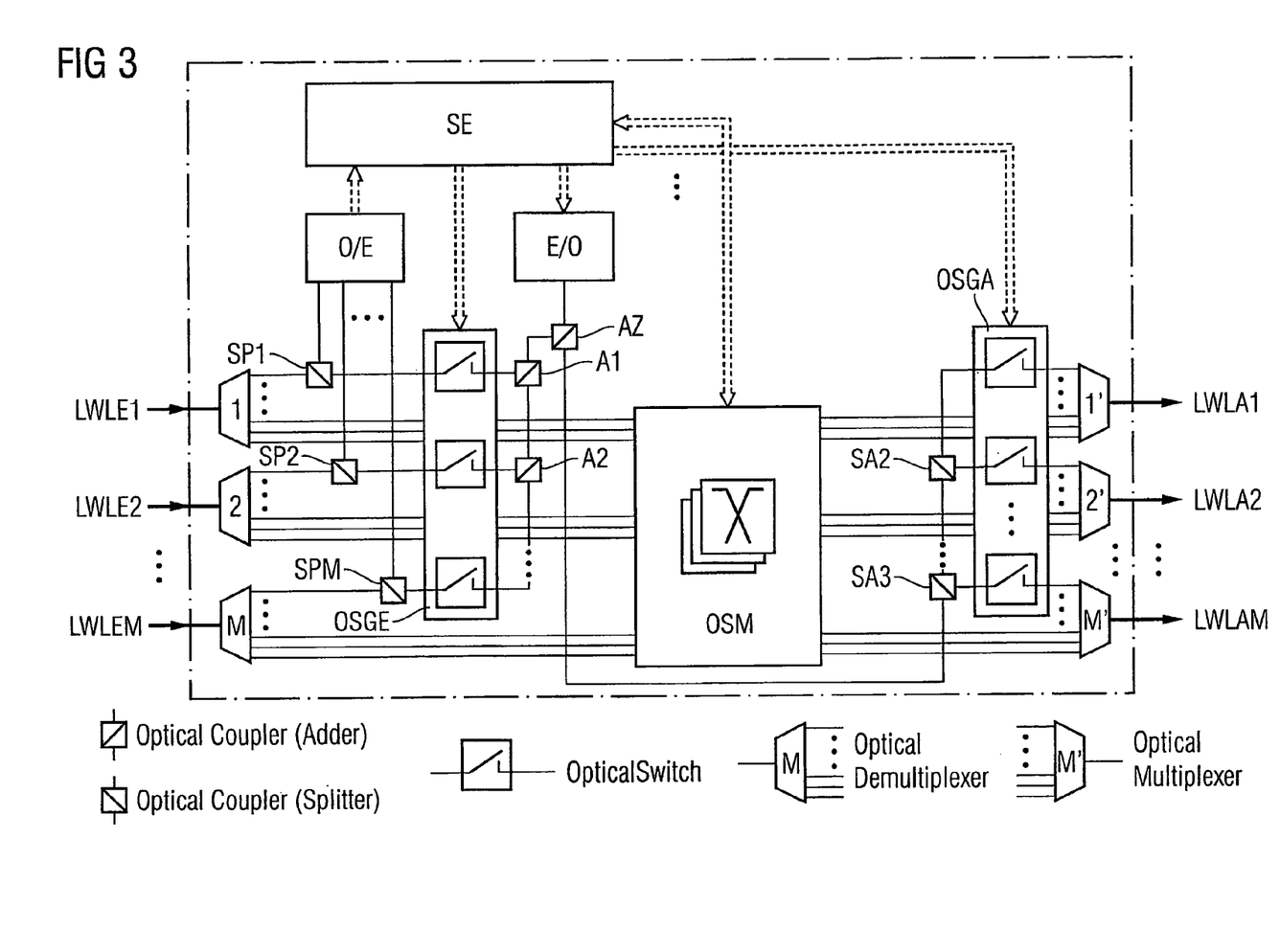
FIG. 3 a scheme for an inventive network node.

FIG. 2 shows a diagram in accordance with FIG. 1, with the difference that, in accordance with the invention, the headers are transmitted to the network nodes of the OBS network over a loop-free common control channel virtually in parallel. In the example the header reaches all network nodes NK B, NK C, NK D, NK E, without any interim processing, i.e. without interim consecutive opto-electrical conversion, evaluation, electro-optical conversion, almost in a "drop and continue" mode. I.e. a header received from the network node is on the one hand sent out directly again and on the other hand processed in the network node. The processing thus virtually occurs in parallel to the sending on of the header. Thus the dissemination of the header over a common control channel produces a time saving up to the sending out the burst. The speed of the header over the control channel is negligibly small in relation to the processing time $T_{setup}$ and the configuration time $T_{OXC}$ in a network node. In accordance with FIG. 3 the result of this is that the time for sending out a burst (after sending out the header) only needs to be slightly greater than the total of processing time $T_{setup}$ and the configuration time $T_{OXC}$:

$$T_B > T_{setup} + T_{OXC}$$

This means that the burst can be sent out quickly in the inventive method.

The common control channel for the headers must be loop-free so that headers do not cross in the OBS network. To this end for example a tree structure must be configured for the transmission of the headers over the common control channel. This can be done for example with a spanning tree algorithm, for example on commissioning or installation of the OBS network.

An optical wavelength division multiplex channel can be used for the common control channel for example. The bursts are transmitted over the remaining wavelength division multiplex channels.

The execution sequence of the reservation has been explained with reference to a one-way or Tell and Go/TAG reservation. The invention can also be used in a similar way for two-way or Tell and Wait/TAW reservations or other reservations.

Another type of implementation of the transmission and reservation can likewise be realized by the common control channel. For example headers or control packets can be sent out by each network node about the status or with information of the network node which is received over the common control channel virtually in parallel by all other network nodes. Every network node thus receives and has information about the status of the other network nodes so that better decisions can be made in the individual network nodes about the reservation and the burst traffic. Thus for example bursts without headers could be sent into the network, provided the corresponding paths are configured and available in the network nodes, which can be "propagated" by corresponding status packets of the respective network nodes over the common control channel. This enables a higher throughput of bursts in the OBS network to be achieved.

Likewise a network node could send out negative confirmation messages in the event of a fault, which are received via the common control channel from the other network nodes so that the sending out of a burst is delayed or the burst is transmitted over other routes or "rerouted".

FIG. 3 shows a network node, comprising a number of incoming optical fibers LWLE1, LWLE2, LWLEM, which are connected on the network node side in each case to an input-side optical demultiplexer 1, 2, ..., M, which each on one side decouple an optical wavelength division multiplex channel which is intended for the common control channel and on the other side decouple the further optical wavelength division multiplex channels for the bursts and feed them to an optical switching matrix OSM. The switching matrix OSM performs a through-switching of a transmission path for burst(s) from a wavelength division multiplex channel of an input-side optical fiber to a wavelength division multiplex channel of an output-side optical fiber. This switching matrix OSM is connected on the other side to output-side multiplexers 1', 2', ..., M' which combine the optical wavelength division multiplex channels over which the bursts are transmitted and the optical wavelength division multiplex channel for the common control channel on the output-side into one optical wavelength division multiplex signal, so that a wavelength division multiplex signal is output via the output-side optical fibers LWLA1, LWLA2, LWLAM connected to an output-side multiplexer 1', 2', ..., M' in each case. The optical wavelength division multiplex channel for the common control channel decoupled in each case by the input-side optical demultiplexer 1, 2, ..., M is fed in each case to an optical coupler or splitter SP1, SP2, SPM which splits this signal up and feeds it on the one hand to a controller of the network node and on the other to a receive-side optical switching device OSGE for the connection of the common control channel. The optical switching device OSGE can also as be embodied as a combination of several individual switches, with a single switch switching the control channel of one optical fiber in each case.

The controller features an opto-electrical converter O/E, a control device SE which evaluates the headers and where necessary creates new headers or control packets, and an electro-optical converter E/O, so that evaluated headers or new headers can be issued for sending out.

The outputs of the optical switching device OSGE or of the optical individual switches are connected on the output side to optical couplers or combiners/adders A1, A2, which combine the through-switched optical control channels of the optical fibers. The combined control channels are fed to a further optical coupler or combiner/adder AZ which is connected on the other side to the control, so that headers issued by the electro-optical converter are fed to the combined control channels. The output of the optical coupler AZ is connected to an output-side optical splitter or a combination of output-side optical splitters SA2, SA3 which split up the combined control channel and feed it in each case via output-side individual switches or an output-side optical switching device OSGA to the output-side multiplexers 1', 2', M', which combine the optical wavelength division multiplex channels over which the bursts are transmitted and the relevant optical wavelength division multiplex channel for the common control channel into one optical wavelength division multiplex signal and issue them via the connected output-side optical fibers LWLA1, LWLA2, ... LWLAM.

With this structure of a network node, received headers can be directly further transmitted/sent out on a common control channel on the one hand and on the other hand fed to the controller of the network node. The controller of the network node is connected to the input-side and output-side optical switching devices OSGE, OSGA and the optical switching matrix OSM so that these can be controlled.

The input- and output-side optical switching devices OSGE, OSGA serve to establish and switch a loop-free common control channel. For example, to avoid a loop, no information is to be received from an input-side optical fiber or no information is to be sent out on an output-side optical fiber. This is achieved by appropriate connection of the switching devices or individual switches so that the channel of the relevant optical fiber will not connect.

Figure 4:
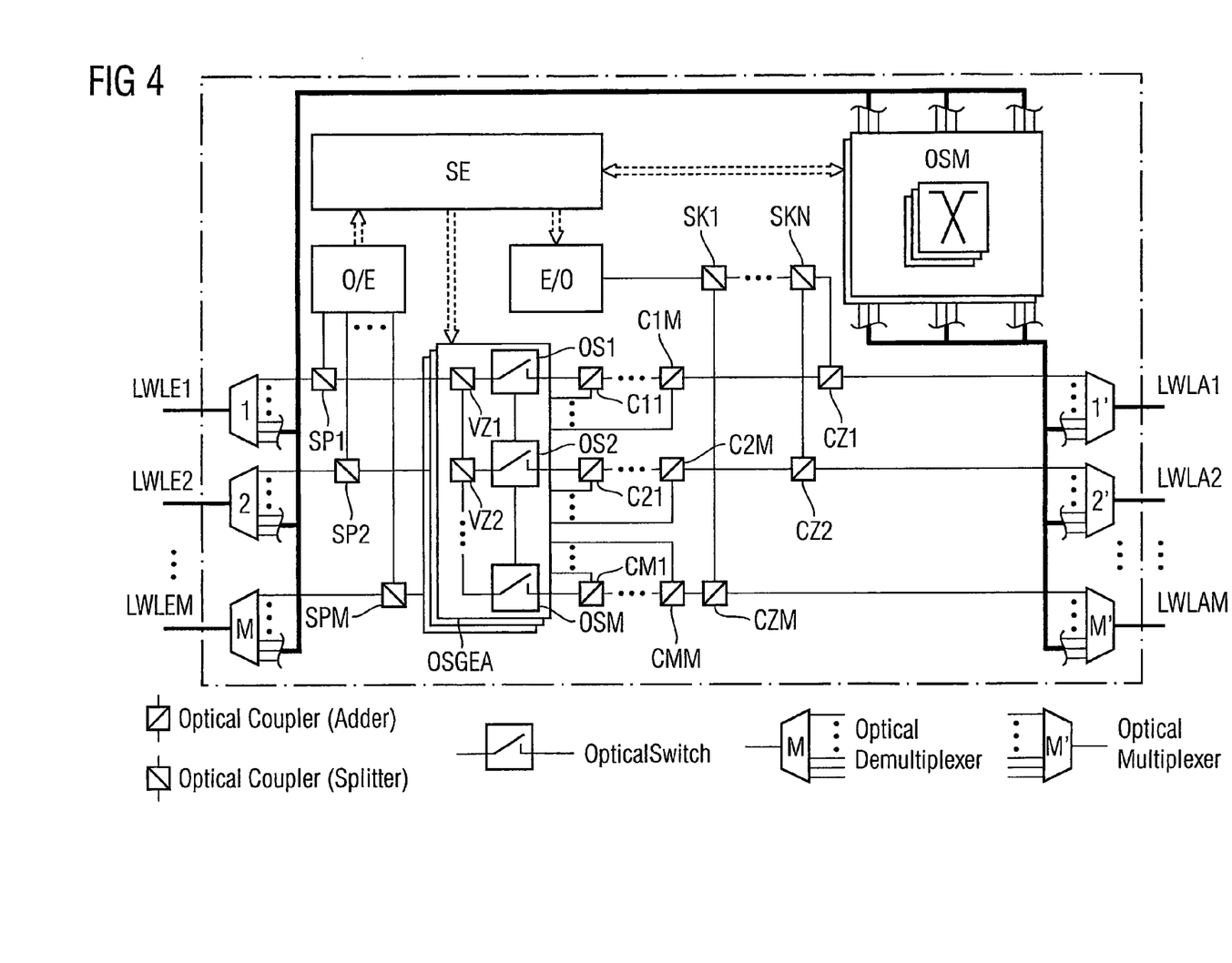
FIG. 4 a further scheme for an inventive network node.

FIG. 4 shows a further embodiment of a network node for implementing the common control channel in accordance with FIG. 3, with the difference being that a group or an array or stack of optical switching devices OSGEA is used. In this case the input-side optical fiber LWLE1, LWLE2, LWLEM is connected to the demultiplexer 1, 2, ..., M, which decouples the wavelength division multiplex channel provided for the common control channel and feeds it to the optical splitter SP1, SP2, SPM, which on one side is connected to the opto-electrical converter O/E which is connected in its turn to the control device SE of the network node and is connected on the other side to an optical switching device OSGEA or group of optical switching devices OSGEA, the output of which is connected to an optical combiner CZ1, CZ2, CZM, which is connected on its other side to the electro-optical converter E/O, which is connected to the control SE and the output of the optical combiners CZ1, CZ2, CZM is connected to the multiplexer 1', 2', ..., M', which couples the common control channel into a channel of the output-side optical fiber LWLA1, LWLA2, LWLAM.

The respective common control channel decoupled for the respective demultiplexer 1, 2, ..., M is fed via the respective common control channel via the respective splitter SP1, SP2, ... or SPM to the respective optical switching device, with an optical switching device being provided for each input-side/received common control channel. The total number of optical switching devices provided for each input-side common control channel forms the group or the array or the stack of optical switching devices OSGEA. An optical switching device is embodied so that the fed common control channel is divided up according to the number of the output-side/common control channels to be issued, in accordance with FIG. 4 with optical distributors/splitters VZ1, VZ2, ... and the split-off common control channels are each fed to a switch OS1, OS2, OSM, which outputs these channels depending on the switch state at the outputs. One output in each case of each switching device of the group is combined by means of optical combiners or adders C11, ..., C1M, C21, C2M, CM1, CMM, so that a feeding common control channel is available for each outgoing optical fiber. This is supplied in each case via further combiners/adders CZ1, CZ2, CZM with a header/signal to be output by the electro-optical converter E/O which is fed beforehand via optical splitters or star couplers SK1, SKN to the combiners/adders CZ1, CZ2, CZM.

An outgoing common control channel is again coupled by means of multiplexer 1', 2', ..., M' into the corresponding optical fiber.

What is of importance is that the channel for the common control channel is split from an input-side optical fiber in each case in accordance with the number of outgoing channels, each split channel is switchable by means of optical switches OS1, OS2, OSM, this is performed for each input-side channel, a split-off channel of an input-side channel is combined again in each case with a split-off channel of another input-side channel on the output side by means of combiners C11, ..., C1M, C21, C2M, CM1, ..., CMM, with this combination being undertaken for each input-side channel, so that in accordance with the number of outgoing channels the headers or control packets of the input-side channels are available on each outgoing channel. This is achieved by the group of optical switching devices OSGEA in accordance with FIG. 4. These can, as already explained, also be implemented as individual switches or other types of groups of optical switch. The output-side channels are each supplied by means of combiners CZ1, CZ2, CZM with headers or control packets from the control of the network node.

Figure 5:
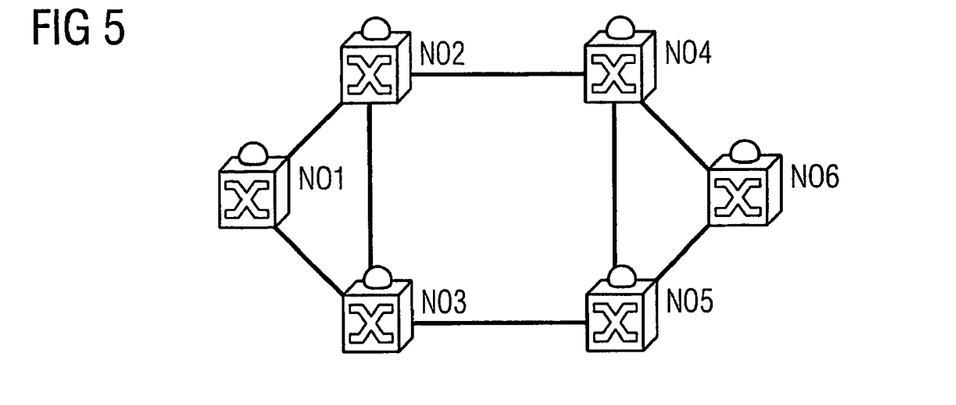
FIG. 5 a scheme of an OBS network.

FIG. 5 shows a OBS network, comprising six network nodes NO1, NO2, NO3, NO4, NO5, NO6, with network node NO1 being connected to network node NO2 and NO3; network node NO2 being connected to network node NO3 and NO4; network node NO3 being connected to network node NO5; network node NO4 being connected to network node NO5 and NO6; network node NO5 being connected to network node NO6. The connection is typically made by means of optical fibers.

Figure 6:
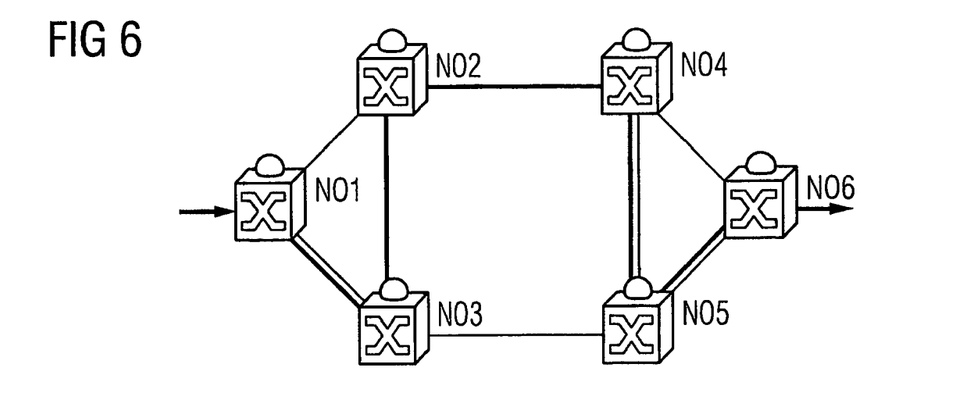
FIG. 6 the OBS network according to FIG. 5 with a first loop-free control channel.

FIG. 6 shows the OBS network in accordance with FIG. 5 with a first switched loop-free common control channel. This is set up from network node NO1 via network node NO3, via network node NO2, via network node NO4, network node NO5 to network node NO6 and shown by a wide dark line in FIG. 6. In this case a channel for the common control channel is provided on a connection between two network nodes in each case, but not connected in the network node in every case, for example in accordance with FIG. 6 for the connections of network node NO1 to network node NO2 or from network node NO3 to network node NO5 or from network node NO4 to network node NO6.

Figure 7:
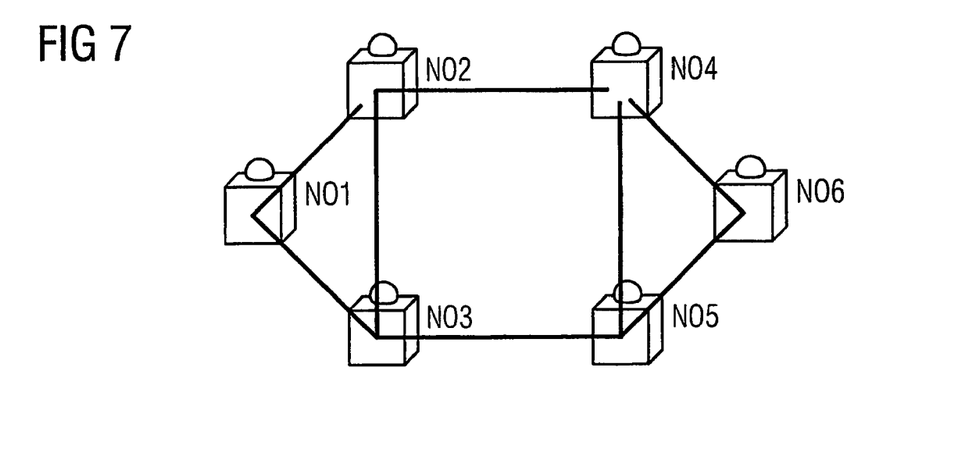
FIG. 7 the OBS network according to FIG. 5 with a second loop-free control channel.

FIG. 7 shows an OBS network in accordance with FIG. 5 with a second connected common control channel, with in this case two or more branches of the common control channel ending at a network node, with these being terminated to avoid loops in each case.

The common control channel is set up from network node NO1 to network node NO2 and is terminated here, from network node NO1 to network node NO3 and from here on one side to network node NO2 and network node NO4; and on the other side is set up to network node NO5, again from a first branch to network node NO4 and a second branch to network node NO6 and from this to network node NO4. If a number of branches end at a network node or if a path is routed through a network node while another ends here, the ending path is terminated in each case so that no loops occur.

Figure 8:
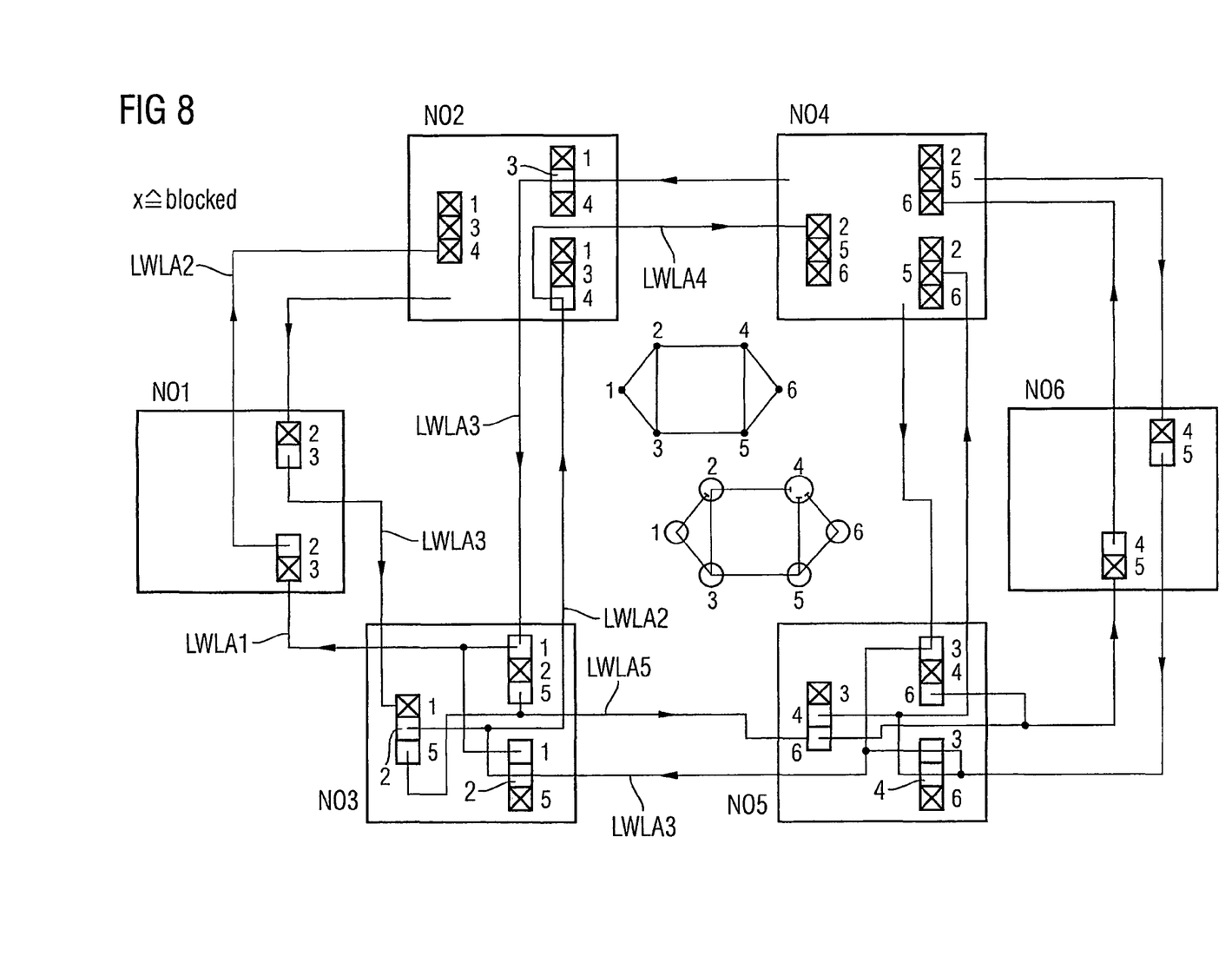
FIG. 8 an interconnection arrangement of channels for a loop-free control channel in accordance with FIG. 7 using network elements as depicted in FIG. 4.

FIG. 8 shows a connection diagram of channels for a loop-free control channel in accordance with FIG. 7 using network elements according to FIG. 4. Boxes are used to indicate the respective groups of optical switching devices OSGEA. A cross in the corresponding box means that the channel of the network node designated by the number is blocked, i.e. not through connected. A "free" box means a through connection.

The invention claimed is:

1. A method for transmission of data packets via an optical burst switching network with a plurality of nodes, wherein the network nodes of the optical burst switching network are connected to each other by optical fibers, and wherein a wavelength division multiplexing method is used, comprising the steps of:
   aggregating data packets into a burst;
   assigning a header to the burst;
   providing a loop-free optical wavelength division multiplex channel as a common control channel for a transmission of headers in the optical burst switching network, wherein all network nodes have access to the control channel;
   transmitting the header via the common control channel to the network nodes,
   receiving the header via the common control channel by the network node and forwarding the header directly to a further network node;
   opto-electrically converting the header received by the network node and forwarding the opto-electrically converted header to a controller; and
   virtually parallel processing the opto-electrically converted header in controllers of the network nodes.

2. The method as claimed in claim 1, wherein the loop-free common control channel is set up when the optical burst switching network is commissioned.

3. The method as claimed in claim 2, wherein the loop-free common control channel is set up based upon a spanning tree procedure.

4. A network node for an optical burst switching network to transmit data packets via the optical burst switching network with a plurality of nodes, wherein the network nodes of the optical burst switching network are connected to each other by optical fibers, and wherein a wavelength division multiplexing method is used for burst transmission, comprising:
   an aggregation device for aggregating data packets into a burst;
   an assignment device for assigning a header to the burst;
   a demultiplexer demultiplexing a common control channel for a transmission of headers configured as loop-free optical wavelength division multiplex channel in the optical burst switching network, wherein the network nodes have access to the common control channel;
   a transmission device for transmitting the header via the common control channel to the network nodes;
   a reception device for receiving the header via the common control channel by the network node and forwarding the header directly to a further network node;
   an opto-electrically converter converting the headers received by the network node; and
   a controller virtually parallel processing the opto-electrically converted header together with controllers of other network nodes.

5. The network node as claimed in claim 4, wherein
   an input-side optical fiber is connected to a demultiplexer;
   the demultiplexer decouples the wavelength division multiplex channel for the common control channel and feeds it to an optical splitter; and
   the optical splitter is connected to via an opto-electrical converter to the controller of the network node.

6. The network node as claimed in claim 5, wherein a further output the optical splitter is connected to an input-side of an optical switching device; and an output of the optical switching device is connected to an optical combiner.

7. The network node as claimed in claim 6, wherein
   an electro-optical converter is connected to an output-side of the controller; and
   an output of the electro-optical converter and the output of the optical switching device are connected via combiners to a multiplexer.

8. The network node as claimed in claim 7, wherein the multiplexer couples the common control channel into a channel of an output-side optical fiber.

* * * * *